United States Patent [19]

Kopach

[11] Patent Number: 5,035,800
[45] Date of Patent: Jul. 30, 1991

[54] FLEXIBLE STRAINER WITH A RELEASABLE CORD

[75] Inventor: Robert J. Kopach, Toledo, Ohio

[73] Assignee: E-Z Strainer, Inc., Chicago, Ill.

[21] Appl. No.: 372,886

[22] Filed: Jun. 28, 1989

[51] Int. Cl.$^5$ ................ B01D 29/03; B01D 29/085
[52] U.S. Cl. ................................ 210/469; 210/474; 210/499
[58] Field of Search ............ 210/464, 465, 469, 473, 210/474, 475, 495, 499, 497.2

[56] References Cited

U.S. PATENT DOCUMENTS

| | | | |
|---|---|---|---|
| 220,691 | 10/1879 | Adney | 210/473 |
| 232,817 | 10/1880 | Harrison | 210/495 |
| 249,494 | 11/1881 | Alden | 210/394 |
| 638,698 | 12/1899 | Bourie | 210/473 |
| 1,374,776 | 4/1921 | Stanley | 210/483 |
| 1,589,486 | 6/1926 | Sharpneck | 210/465 |
| 1,624,276 | 4/1927 | Nelson | 210/474 |
| 1,767,269 | 6/1930 | Westerberg | 210/474 |
| 2,224,409 | 12/1940 | Schleyer | 210/473 |
| 4,040,964 | 8/1977 | Hegyi | 210/238 |
| 4,052,319 | 10/1977 | Friedman | 210/465 |
| 4,169,331 | 10/1979 | Baker | 210/238 |
| 4,220,534 | 9/1980 | Perry | 210/469 |

Primary Examiner—Robert A. Dawson
Assistant Examiner—Wanda L. Millard
Attorney, Agent, or Firm—Leydig, Voit & Mayer

[57] ABSTRACT

A strainer which may be adapted to fit over an opening of a variety of food storage and preparation containers comprising a flexible matrix, a flexible cord which is slidably disposed within a conduit, said conduit being located along the perimeter of said matrix and having an opening through which the ends of said cord protrude, and a means for releasably engaging the ends of said cord, wherein after said strainer is placed over the opening of the container, the ends of said cord are pulled through said engaging means to adapt the circumference of the conduit to that of the container, said cord being engaged when said conduit contacts the container.

5 Claims, 1 Drawing Sheet

FLEXIBLE STRAINER WITH A RELEASABLE CORD

BACKGROUND OF THE INVENTION

1. Field of the Invention

The present invention relates to strainers, and more particularly, to a strainer which is adjustably affixable to a variety of sizes and types of food storage and preparation containers, such as cans, bowls, saucepans, and stock pots.

2. The Prior Art

The prior art includes strainers that are attached to containers to facilitate the separation of liquids from solids therein. Generally, the prior art discloses strainers having relatively rigid edges which serve as a base onto which the container is contacted.

U.S. Pat. No. 249,494 illustrates a strainer for mixed drinks comprised of a web of wire surrounded by a rigid rim, a handle, and a stop or rest, the handle and stop being attached to the rim. This device is adapted so as to fit over and outside of the top of a vessel such that when the container is tilted, the liquid portion is poured through the web and the solid portion remains in the container.

U.S. Pat. No. 4,040,964 is directed toward a strainer having a handle which can be adjustably affixed to various sizes and types of food containers such as cans. This device comprises a fixed diameter disc of wire mesh mounted to a handle with a separate adjustable flexible band also mounted to the handle. When the device is operated, the band is secured and locked around the sides of a container. This serves to locate the mesh against the opening of the container. The user may then invert or tilt the container by use of the handle. In this way, liquid is drained from the container, while the solids are retained therein.

However, both devices fail to provide for a straining device that is simple in design, inexpensive to manufacture, easy to clean, and may be used on irregularly-shaped containers.

The present invention overcomes the problems associated with the prior art devices by providing a strainer which may be adapted to fit over an opening of a variety of food storage and preparation containers comprising a flexible matrix, a flexible cord which is slidably disposed within a conduit, said conduit being located along the perimeter of said matrix and having an opening through which the ends of said cord protrude, and a means for releasably engaging the ends of said cord, wherein after said strainer is placed over the opening of the container, the ends of said cord are pulled through said engaging means to adapt the circumference of the conduit to that of the container, said cord being engaged when said conduit contacts the container.

SUMMARY OF THE INVENTION

Therefore, it is a principal object of this invention to provide a simple and efficient culinary strainer, or collander, adapted for use in connection with cans, bowls, saucepans, and stock pots for the purpose of retaining solids within the container, while allowing any liquids within the container to be discharged.

A related object is to provide a means whereby the application and removal of the strainer is accomplished with a minimum of time and effort by the user.

A further object is to accomplish the aforementioned objects while ensuring sufficient retention of the strainer against variously shaped container openings so as to ensure proper separation of liquids from solids and to minimize any accidental slipping of the strainer off the container due to the weight of the food within the container.

Yet another object is to design a strainer that is inexpensively and easily manufactured.

An additional object is to provide a strainer that may be cleaned in a conventional washing machine.

These objects, as well as further objects and advantages of the present invention, will become readily apparent after examination of the illustrative embodiment and the accompanying drawings.

In order that the present invention may be more fully understood, it will now be described, by way of example, with reference to the accompanying drawings in which.

While the invention will be described in connection with a preferred embodiment, it is understood that the invention is not intended to be so limited. On the contrary, it is intended to cover all alternatives, modifications, and equivalents as may be included within the spirit and scope of the invention as defined by the appended claims.

DETAILED DESCRIPTION OF THE PREFERRED EMBODIMENT

Figure 1:
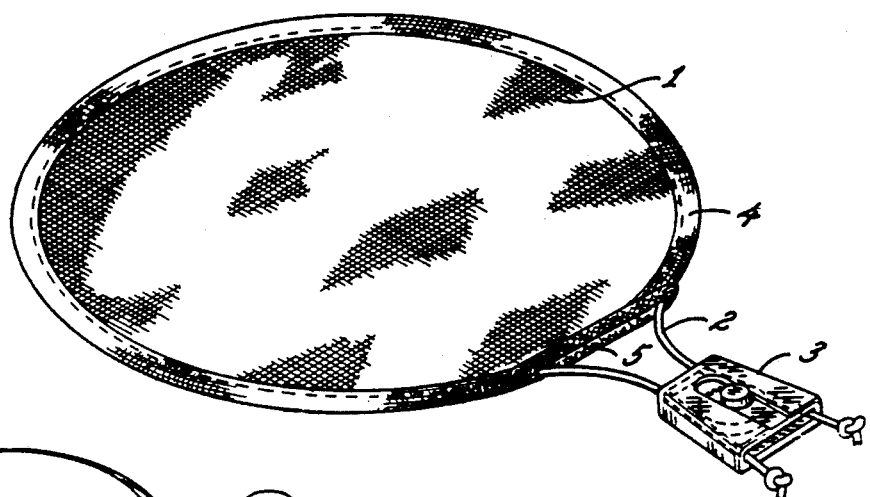
FIG. 1 illustrates a representation of the preferred embodiment of the present invention.

Referring initially to FIG. 1, an embodiment of the subject strainer which is adaptable to fit over an opening of a variety of food storage and preparation containers is illustrated. This embodiment is comprised of several components, namely, a flexible matrix 1, a cord 2, and a means for releasably engaging the cord 3.

The matrix 1, or mesh, may be comprised of any material that is sufficiently flexible to allow for proper operation of the strainer. It is contemplated that any type of polymer-based materials, for example nylons and polyesters, natural materials such as cottons, or any combination thereof, would be suitable as materials for the matrix. Of course, if the strainer were to be used on containers that were hot, such as stock pots or saucepans, a material that is sufficiently heat resistant is preferable. Further, if it is desirable to clean and re-use the strainer, a material that would withstand the temperatures that are reached rendered during the washing and drying cycles of dishwashers, and washing machines is preferred. Optimally, cotton, or cotton-polyester blends, are preferred.

The matrix 1 should be larger in diameter than the opening of the container to which it will be applied. Moreover, it should have pore sizes that are sufficient to allow liquid to be removed from the container, but not so large so as to allow the solids within the container to escape. Therefore, the size of the pores may vary according to the size of the solids desired to be retained in the container.

The present invention further contemplates a cord 2 that is located within a conduit 4, this conduit 4 being located along the perimeter of the matrix 1. The conduit 4 may either be a piece of tubing that is affixed to the matrix in the location described above, or it may be produced using the matrix itself. For reasons that will become more readily apparent later, it is important that the conduit chosen be compressible. In this preferred embodiment, the cord 2 is placed on the perimeter or outermost edge of the matrix 1, and the edge of the matrix 1 is folded inwardly over the cord 2. The edge is then permanently affixed to the interior of the matrix 1, thereby forming a conduit 4 through which the cord 2 may slide freely. Any conduit that is selected should allow the cord to slide therethrough relatively freely.

The conduit will further comprise one or two openings through which the ends of the cord will protrude. If a single opening is used, as indicated by 5 in FIG. 1, it will most likely be larger than if two openings are used. This is necessary to allow both ends of the cord to pass through the opening freely.

The cord 2 may be produced from any flexible material available, so long as it possesses strength sufficient to allow proper operation of the strainer. Obviously, if the strainer is of the reusable type, it is desirable that the cord be able to withstand the cleaning procedures mentioned previously without experiencing a significant loss in strength. Generally, any type of natural or non-natural materials can be used including metals such as copper. Nylons, polyesters, cottons, or mixtures thereof may also be used. Preferably, a flexible metal wire is used because it conforms to the shape of the container more securely than those materials having a greater degree of flexibility, such as nylon or cotton. Optimally, the wire may be covered with any type of polymer-based material, such as rubber, which acts to improve the ability of the engaging means to engage said cord.

The ends of the cord that protrude from the conduit are located within a means for releasably engaging the cord 3. Although any type of releasably engaging means that will allow proper operation of the strainer will suffice, it is preferred that the cord fastener described in U.S. Pat. No. 3,564,670 be utilized; this reference hereby being incorporated by reference into the present application.

Figure 2:
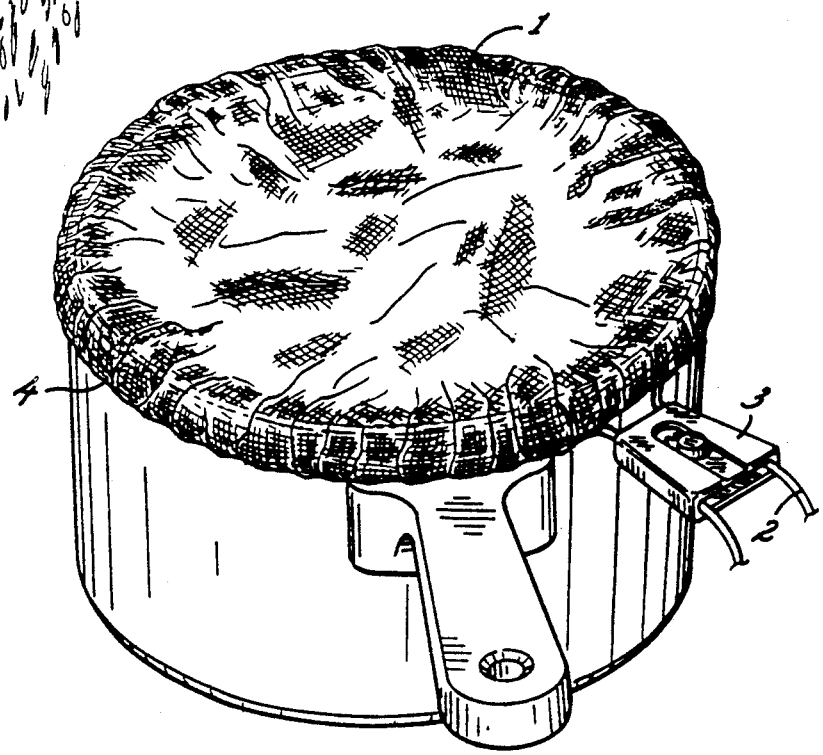
FIG. 2 illustrates the same preferred embodiment secured onto a typical container, specifically a saucepan.

Generally, the operation of the strainer is as follows. The strainer is initially centered with regard to the container opening, with the edges of the strainer overlapping the opening and having the ability to at least partially cover the sidewalls of the container. For optimum results, a container having a diameter of approximately 1½ inch less than the diameter of the strainer should be utilized. The operator then grasps both ends of the cord in one hand, and the releasably engaging means with the other. The engaging means is then slid toward the container until the conduit is in secure contact with the container. A portion of the matrix may also contact the container. Once this contact occurs, the engaging means is locked in place. This strainer-saucepan combination is illustrated by FIG. 2. The conduit, and possibly a portion of the matrix, will have a slightly crinkled or bunched effect, but this is of no consequence so long as the strainer does not slip off the container. It is the compressive ability of the conduit that helps the strainer contact the container in a secure manner. If there is some slippage, use of a strainer having a smaller diameter is suggested.

It is also contemplated that the portion of the conduit, or a portion of the matrix, that contacts the container may be coated with a non-slip material. This serves to increase the ability of the strainer to securely contact the container. Preferably, a rubber-like compound may be utilized.

Figure 3:
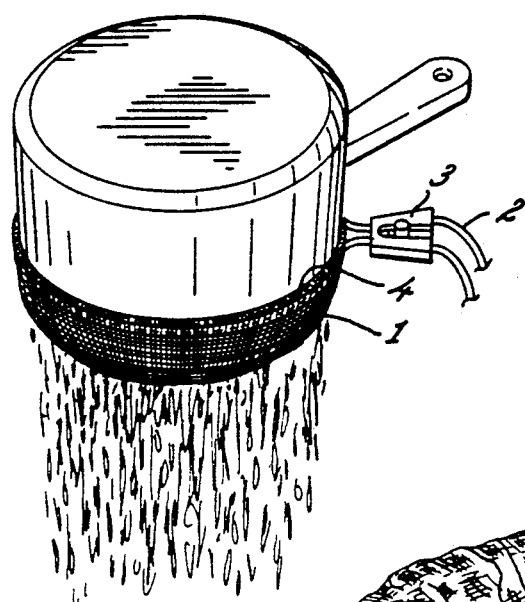
FIG. 3 illustrates the preferred embodiment in use wherein the saucepan onto which said embodiment is secured is tilted so as to allow the liquids to exit the saucepan.

After the strainer is in place, the container is tilted so as to allow the liquids to escape while the solids are retained in the container, this being illustrated in FIG. 3. When the separation is completed, the engaging means is disengaged, or unlocked, and the strainer removed. After rinsing or washing, the strainer may be reused. However, it is also contemplated that this strainer be disposable after a single use.

Thus, as has been shown, the present invention provides a novel strainer that is inexpensive, easily manufactured, easily cleaned, and operates with ease in comparision to those strainers presently available. Moreover, it is easily adaptable for use with many different types of containers having a myriad of opening sizes and shapes, this not being previously contemplated by the prior art devices.

I claim as my invention:

1. A strainer which may be adapted to fit over an opening of a variety of food storage and preparation containers comprising a flexible matrix, a flexible cord which is coated with a polymer-based material, said cord being slidably disposed within a conduit, said conduit being located along the perimeter of said matrix and having an opening through which the ends of said cord protrude, and a means for releasably engaging the ends of said cord, wherein after said strainer is placed over the opening of the container, the ends of said cord are pulled through said engaging means to adapt the circumference of the conduit to that of the container, said cord being engaged when said conduit contacts the container.

2. The strainer of claim 1, wherein said polymer-based material is rubber.

3. The strainer of claim 2, wherein the matrix is comprised of cotton.

4. A strainer which may be adapted to fit over an opening of a variety of food storage and preparation containers comprising a flexible matrix, a flexible cord which is slidably disposed within a conduit, said conduit being located along the perimeter of said matrix and having an opening through which the ends of said cord protrude, and a means for releasably engaging the ends of said cord, whereinafter said strainer is placed over the opening of the container, the ends of said cord are pulled through said engaging means to adapt the circumference of the conduit to that of the container, said cord being engaged when said conduit contacts the container, wherein the portion of said conduit that contacts the container is coated with a non-slip material.

5. The strainer of claim 4, wherein said non-slip material is rubber.

* * * * *